Feb. 9, 1932.        D. M. DUNWOODIE        1,844,148
                      HOSE STRUCTURE
                    Filed June 14, 1928
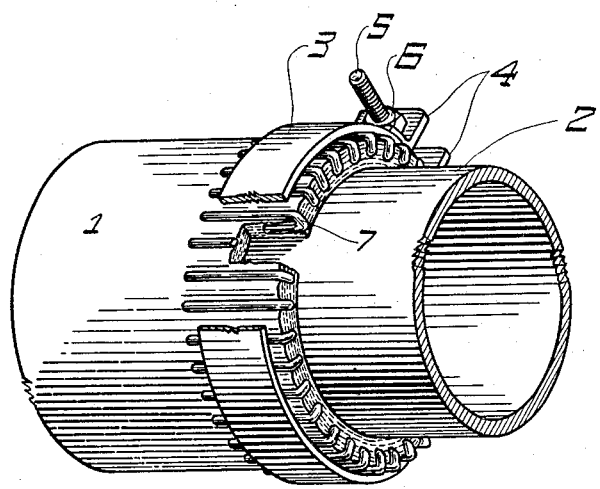
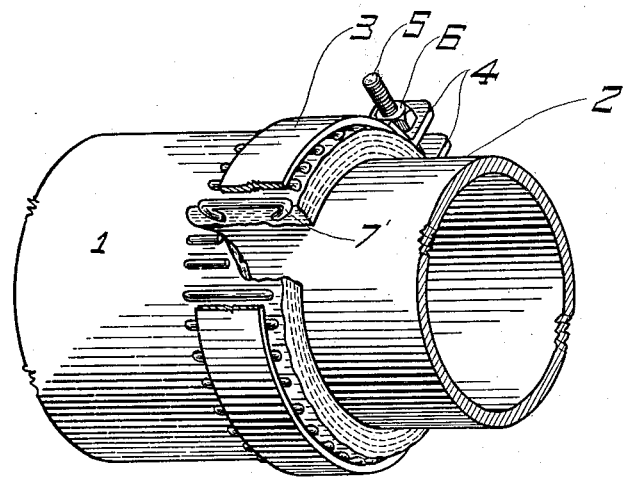
INVENTOR
BY David M. Dunwoodie
Robert H. Young ATTORNEY Patented Feb. 9, 1932

1,844,148

UNITED STATES PATENT OFFICE

DAVID M. DUNWOODIE, OF TROTWOOD, OHIO

HOSE STRUCTURE

Application filed June 14, 1923. Serial No. 285,457.

This invention relates to a novel manner of securely and hermetically coupling a rubber hose or the like to a metallic tube and more specifically this invention contemplates the use of a rubber hose having a plurality of spaced projections on its outer periphery so that when securing the hose to a metal tube by means of a split hose clamp the projections are caused to move closer together thereby contracting and uniformly tightening the hose about the metallic tube.

This invention further has for its object to uniformly space the projections so that crimps formed on the outer surface of the hose when clamped to the metal tube will be received within the spaces formed between the projections and free from downward pressure exerted by the split clamp.

With the above and other objects in view the invention consists of the novel features of construction and the combination and arrangement of parts hereinafter fully described and claimed and illustrated in the accompanying drawings, in which Fig. 1 is a perspective view of my invention with parts broken away.

Fig. 2 is a view similar to Fig. 1 showing a modification of my invention.

Referring to the drawings the reference numeral 1 designates the rubber hose of any known or suitable construction having means embedded therein for causing the end of the rubber hose when secured to the metal tube or nipple 2 by means for the split clamp 3, to uniformly crimp and effect an even pressure against the tube.

The means for effecting this uniform pressure consists of a split ring clamp 3 of the well-known type having apertured ears 4 to receive a bolt 5 and nut 6 for adjustably tightening the clamp about the ribs or projections 7 formed on the hose 1.

The ribs 7 are made of strips of wire that are uniformly spaced and parallelly arranged throughout the periphery of the tube and at its end. These are fastened to the hose in any suitable manner and as shown in Fig. 1 are U-shaped having one leg embedded between the several plies of the hose and the other leg bearing on the outer perihpery of the same. It will be understood that these may be formed at the same time that the hose is manufactured, or at any time after it is made. In forming these ribs, strips of wire of uniform length are forced either by hand or machine longitudinally of the hose and between the plies thereof for a portion of their length, to securely fasten the strips to the hose. The portion of the metal strip extending beyond the end of the hose is then bent upwardly, then forwardly and downwardly.

In Fig. 2 of the drawings the ribs 7' are shown in the form of a staple and are arranged as shown in Fig. 1 except that they are positioned somewhat inwardly of the edge of the tube to allow for sufficient anchoring surface. These ribs or staples 7' may be formed and secured to the hose in any well-known manner of forming and anchoring staples.

I claim:

1. The combination with a split clamp adapted to couple a hose and metal tube of spaced elements interposed between said hose and clamp and cooperating with the inner wall of said clamp and the outer surface of said hose within the confines of said clamp to uniformly contract said hose about said tube throughout the periphery thereof.

2. The combination with a split clamp adapted to couple a hose and metal tube of a plurality of looped members partially embedded in said hose, said looped members being longitudinally disposed in spaced relation about the periphery of said hose and having their exposed portions cooperating through their effective lengths with the inner wall of said clamp and that portion of said hose within the confines of said clamp for uniformly contracting said hose about said tube.

3. A rubber hose having a clamping portion provided with a plurality of circumferentially spaced, longitudinally disposed metallic ribs adapted to cooperate with the inner wall of a clamp for uniformly contracting said hose, said ribs having a portion thereof exterior of the hose and contacting with the outer surface thereof throughout its effective length.

4. A rubber hose having a clamping portion provided with a plurality of circumferentially spaced elements adapted to cooperate with the inner wall of a split-clamp for uniformly contracting said hose, each of said elements having a portion exterior of said hose and contacting with the surface thereof substantially throughout its effective length.

In testimony whereof I affix my signature.

DAVID M. DUNWOODIE.